United States Patent [19]

Pai

[11] Patent Number: 5,782,561
[45] Date of Patent: Jul. 21, 1998

[54] DETACHABLE PACIFIER WITH ELECTRONIC THERMOMETER

[76] Inventor: Yun-Shen Pai, P. O. Box 55-846, Taipei, Taiwan

[21] Appl. No.: 846,581

[22] Filed: Apr. 30, 1997

[51] Int. Cl.[6] .................. G01K 13/00; A61B 5/00; A61J 17/00
[52] U.S. Cl. .................. 374/151; 600/549; 606/236; 215/11.2
[58] Field of Search .................. 374/151; 215/11.2; 128/736; 606/234, 235, 236; 600/549

[56] References Cited

U.S. PATENT DOCUMENTS

| | | | |
|---|---|---|---|
| 5,178,466 | 1/1993 | Chiu | 374/151 |
| 5,178,467 | 1/1993 | Chen | 374/151 |
| 5,312,187 | 5/1994 | Chiu | 374/151 |
| 5,534,013 | 7/1996 | Zeindler | 374/151 |
| 5,611,622 | 3/1997 | Wang | 374/151 |

FOREIGN PATENT DOCUMENTS 2277377  10/1994  United Kingdom .................. 374/151

*Primary Examiner*—Diego F.F. Gutierrez

[57] ABSTRACT

A detachable pacifier with an electronic thermometer includes: a pacifier having a hollow nipple member formed on a guard member and a pair of staple portions disposed on the pacifier; and an electronic thermometer having a pair of fastening buckles detachably coupled to the pair of staple portions on the pacifier and a probe member protruding forwardly from a temperature indicating circuit mounted in the thermometer, the probe member having a plurality of teeth circumferentially formed on a front portion of the probe member, whereby upon insertion of the probe member into the nipple member, the teeth on the probe member will expand; the nipple member resulting in a thinning of a front nipple portion, thus decreasing the thermal resistance of the nipple member for a precise temperature measurement, whereby upon detachment of the pacifier from the electronic thermometer; the pacifier may be dipped in a boiling water bath for sterilization.

1 Claim, 3 Drawing Sheets

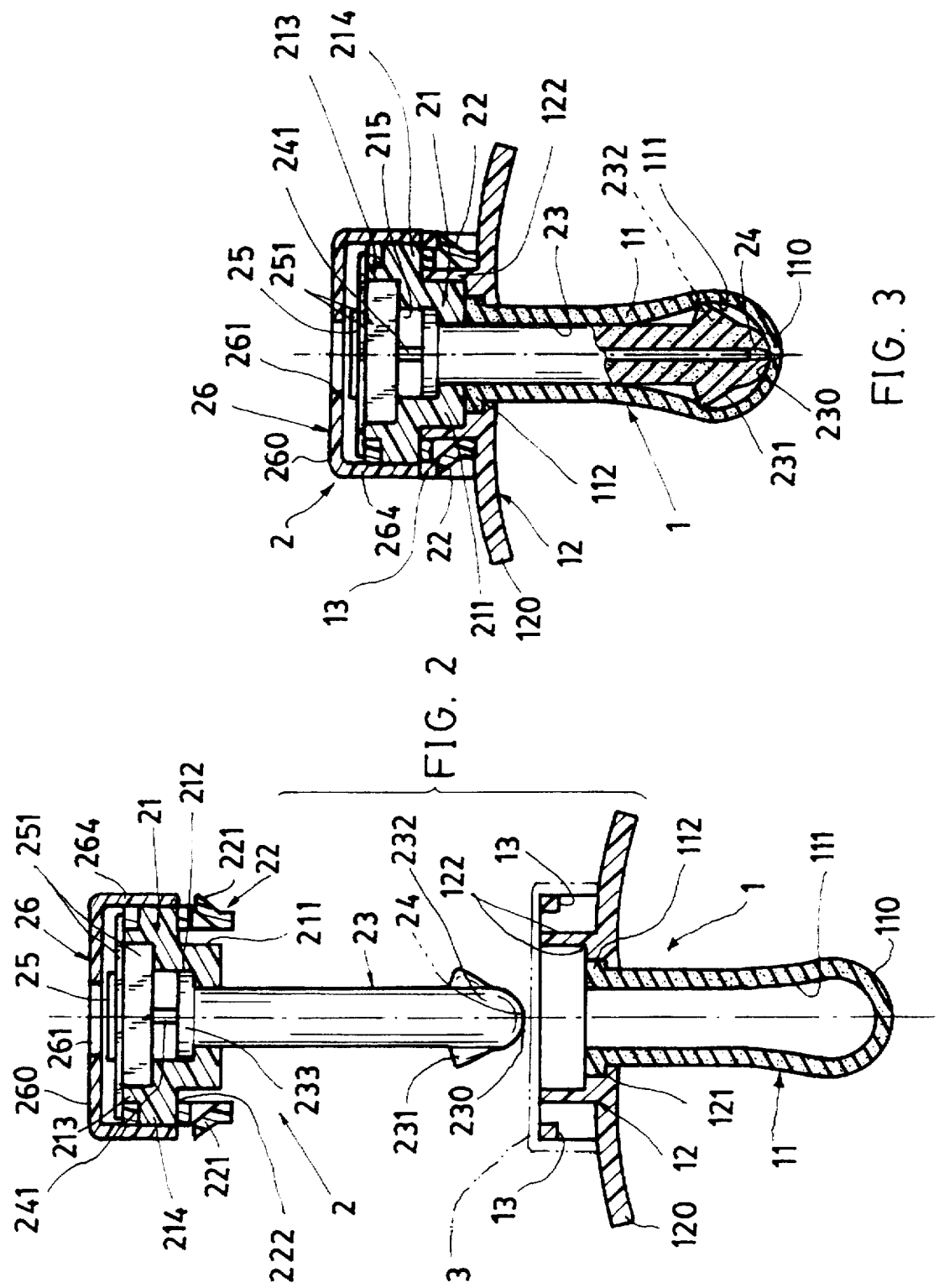

5,782,561

1

DETACHABLE PACIFIER WITH ELECTRONIC THERMOMETER

BACKGROUND OF THE INVENTION:

For sterilizing a conventional pacifier combined with an electronic thermometer, it may be dropped into a boiled water bath. However, the electronic thermometer can not resist the high temperature of the boiled water thereby being easily damaged.

If such a conventional pacifier integrated with an electronic thermometer is not boiled in order to kill any bacteria accumulated on the nipple portion of the pacifier, it will be harmful to a baby's health.

Therefore, the present inventor invented a combination of a pacifier and a thermometer device in which the pacifier may be detached from the thermometer and then dipped into a boiled water bath for sterilization.

SUMMARY OF THE INVENTION

The object of the present invention is to provide a detachable pacifier with an electronic thermometer including: a pacifier having a hollow nipple member formed on a guard member and a pair of staple portions disposed on the pacifier; and an electronic thermometer having a pair of fastening buckles detachably coupled to the pair of staple portions on the pacifier and a probe member protruding forwardly from a temperature indicating circuit mounted in the thermometer with a plurality of teeth circumferentially formed on a front portion of the probe member whereby upon insertion of the probe member into the nipple member, the teeth on the probe member will expand the nipple member for thinning a front nipple portion, thus enhancing the thermal conductivity of the nipple member for a precise temperature measurement, and whereby upon detachment of the pacifier from the electronic thermometer, the pacifier may be dipped in a boiling water bath for sterilization.

BRIEF DESCRIPTION OF THE DRAWINGS

FIG. 2 is a sectional drawing showing a pacifier separated from an electronic thermometer in accordance with the present invention.

FIG. 3 is a sectional drawing of the present invention as assembled.

DETAILED DESCRIPTION

Figure 1:
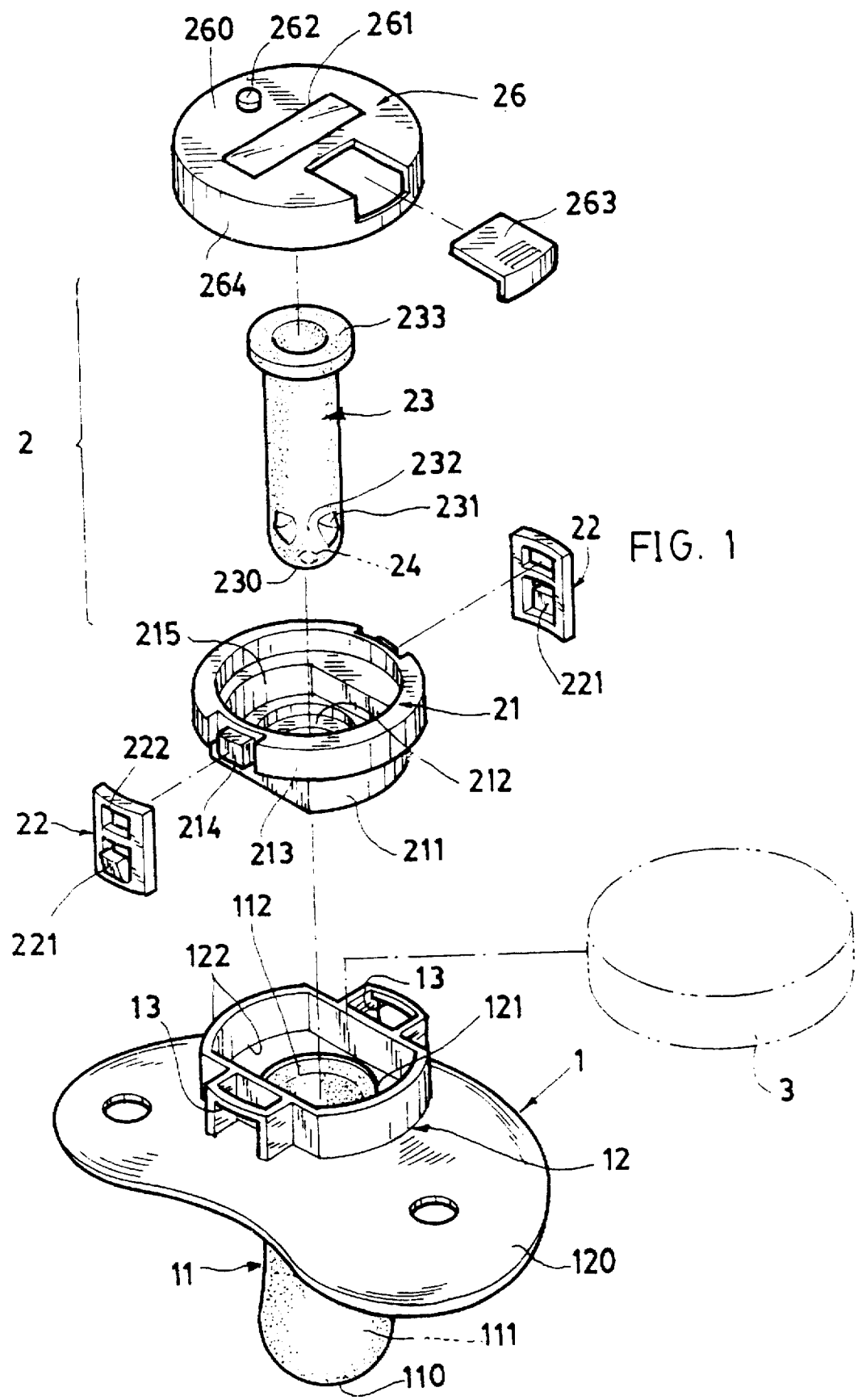
FIG. 1 is an exploded view showing the elements in construction of the present invention.

As shown in the drawing figures, the present invention comprises: a pacifier 1 and an electronic thermometer 2 detachably combinable with the pacifier 1. The structure, shapes, and materials of the pacifier 1 and the thermometer 2 are not limited in the present invention.

The pacifier 1 includes a nipple member 11 having a front nipple portion 110, a hollow portion 111 recessed in the nipple member 11, and a rear rim 112 formed on a rear end of the nipple member 11; a guard member 12 having a blocking flange 120, a rim groove 121 recessed in a central portion of the blocking flange 120 for engaging the rear rim 112 of the nipple member 11, and a central socket 122 formed in a central portion of the flange and communicated with the rim groove 121; and a pair of staple portions 13 formed on the flange 120 and diametrically disposed on opposite sides of the central socket 122. The socket 122 may also be separated from the flange 120 during the manufacturing process, and then both the socket 122 and the flange 120 are assembled to form the pacifier.

A pacifier cap 3 may also be provided to engage and cover the central socket 122 of the pacifier 1 when dipped into a boiling water bath (not shown) for sterilization and for hygienic purposes. Some modifications may be made to the pacifier to provide teething and gum massaging for an infant. These modifications are not limited in the present invention.

The electronic thermometer 2 includes a base member 21 having a pair of fastening buckles 22 formed on opposite sides of the base member 21 to be coupled with the pair of staple portions 13 formed on the flange 12 for detachably coupling the electronic thermometer 2 with the pacifier 1 as shown in FIGS. 2 and 3; a probe member 23 protruding forwardly from the base member 21 and insertable into the hollow portion 111 of the nipple member 11 having a thermistor 24 formed on a front end of the probe member 23 for sensing temperature through the front nipple portion 110 of the nipple member 11 when bitten by an infant, a temperature display 25 mounted on the electronic temperature indicating circuit 251 electrically connected to the thermistor 24 through two wires 241 passing through the probe member 23 for indicating the temperature as sensed by the thermistor 24, wherein the temperature signal as sensed by the thermistor 24 will be converted into a digit temperature data to be displayed on the temperature display 25 (which may be a LCD) after being processed by the electronic temperature indicating circuit 251 stored in a chamber 215 formed in the base member 21; and a cap member 26 covering the base member 21.

The base member 21 includes a plug portion 211 engageable with the central socket 122 in the pacifier 1, an annular groove 212 annularly formed in the plug portion 211 for engaging a rear flange 233 of the probe member 23 for mounting the probe member 23 in the plug portion 211 of the base member 21, a side wall 213 which may be a cylindrical wall (not limited) circumferentially formed on the plug portion 211, a pair of protrusions 214 diametrically disposed on opposite sides of the plug portion 211 for fixing the two fastening buckles 22 on the protrusions 214, and a chamber 215 formed in the plug portion 211 for storing the electronic temperature indicating circuit 251 in the chamber 215.

Each fastening buckle 22 includes a fixing hole 222 engaged with each protrusion 214 formed on the base member 21 and a hook member 221 resiliently held on the buckle 22 for coupling each staple portion 13 formed on the pacifier 1. The fastening buckle 22 may also be integrally formed with the base member 21 or with the cover member 26 when made by a plastic molding process.

The probe member 23 includes a plurality of teeth 231 circumferentially formed on a front portion of the probe member 23 adjacent to a front membrane portion 230 formed on a front tip end of the probe member 23 for locating the thermistor 24 on the front membrane portion 230, a plurality of air passages 232, each passage 232 defined between every two neighboring teeth 231, and a rear flange 233 formed on a rear end portion of the probe member 23 to be engaged with the annular groove 212 in the base member 21. The front membrane portion 230 may be made elastic to buffer any stress occurring at the front end of the probe member 23 when the front nipple portion 110 is tensioned as expanded by the teeth 231 during a temperature so as to prevent a hard and uncomfortable feeling when bitten by an infant.

The cap member 26 includes a bottom cover 260 having a display window 261 for reading the temperature on the temperature display 25, a push button 262 for actuating the temperature indicating circuit 251 for displaying the temperature, a battery cover 263 removably closing a battery chamber (not shown) formed in the cap member 26; and a periphery portion 264 circumferentially extending from the bottom cover 260 which engages the side wall 213 of the base member 21 so as to cap the cap member 26 on the base member 21 in order to integrate the electronic thermometer 2.

Figure 5:
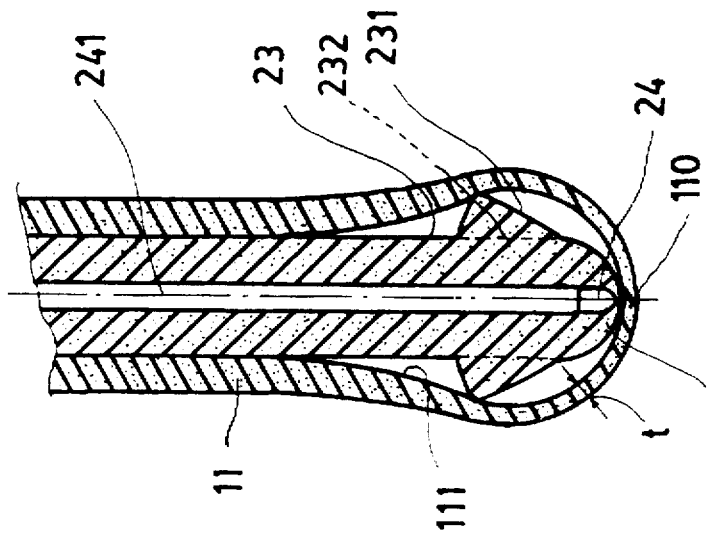
FIG. 5 is a partial sectional drawing of the nipple member with the probe member in accordance with the present invention.
Figure 4:
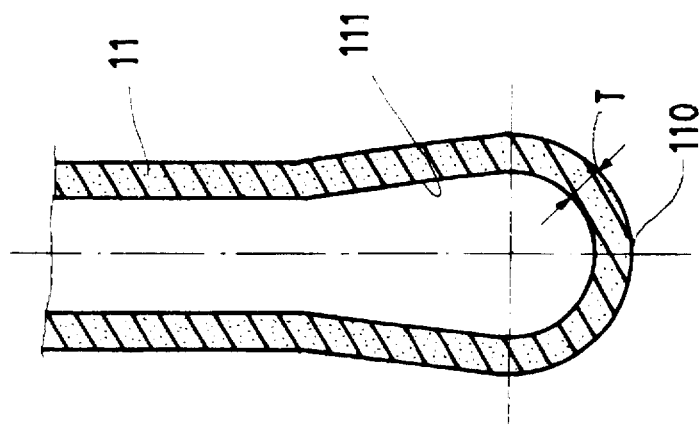
FIG. 4 is a partial sectional drawing of the nipple member of the present invention.

When using the present invention, the pacifier 1 is assembled with the electronic thermometer 2 as shown in FIG. 3, the probe member 23 of the thermometer 2 is inserted into the nipple member 11 of the pacifier to allow the teeth 231 around the front portion of the probe member 23 to expand the front nipple portion 110 to a thinner dimension as shown from FIG. 4 (T) to FIG. 5 (t) which decreases the thermal resistance through the wall thickness of the front nipple portion 110, thereby enhancing the measurement reliability and precision of the thermometer 2. Meanwhile, the air passages 232 as formed among the teeth 231 will help insertion of the probe member 23 into the nipple member 11 and also will help withdrawal of the probe member 23 from the nipple member 11.

For sterilization of the pacifier 1, the pacifier 1 may be separated from the electronic thermometer 2 by decoupling the buckles 22 on the thermometer 2 from the staple portions 13 on the pacifier 1 as shown in FIG. 2. The pacifier 1 is then dropped into a boiling-water bath in order to kill bacteria and for sterilization treatment without damaging the part of the electronic thermometer 2 which has been previously separated from the pacifier.

The present invention prolongs the service life of the thermometer and provides a more reliable temperature measurement than the conventional thermometer combined with a pacifier.

The present invention may be modified without departing from the spirit and scope of the present invention. The shapes, locations, and number of the teeth 231 formed on the probe member 23 are not limited in this invention, and thus may be optionally modified.

I claim:

1. A pacifier and thermometer device comprising: a pacifier including: a nipple member having a front nipple portion, a hollow portion recessed in the nipple member, and a rear rim formed on a rear end of the nipple member; a guard member having a blocking flange, a rim groove recessed in a central portion of the blocking flange for engaging the rear rim of the nipple member, and a central socket formed in a central portion of the flange and communicated with the rim groove; and a pair of staple portions formed on the flange and diametrically disposed on opposite sides of the central socket; and an electronic thermometer including: a base member having a pair of fastening buckles formed on opposite sides of the base member to be coupled with the pair of staple portions formed on the blocking flange for detachably coupling the electronic thermometer with the pacifier; a probe member protruding forwardly from the base member and insertable into the hollow portion of the nipple member having a thermistor formed on a front end of the probe member for sensing temperature through the front nipple portion of the nipple member when bitten by an infant, a temperature display mounted on an electronic temperature indicating circuit electrically connected to the thermistor through two wires passing through the probe member for indicating the temperature as sensed from the thermistor wherein a temperature signal as sensed by the thermistor is converted into a digit temperature data displayed on the temperature display as processed by the electronic temperature indicating circuit stored in a chamber formed in the base member; and a cap member covering the base member;

said probe member further including a plurality of teeth circumferentially formed on a front portion of the probe member adjacent to a front membrane portion formed on a front tip end of the probe member for locating the thermistor on the front membrane portion, a plurality of air passages, each of said air passages defined between every two neighboring teeth, and a rear flange formed on a rear end portion of the probe member to be engaged with an annular groove in the base member.

* * * * *